United States Patent
Kohda et al.

(10) Patent No.: US 10,797,897 B2
(45) Date of Patent: Oct. 6, 2020

(54) MULTI-STEP REMOTE PACKET BROADCASTING/MULTICASTING MECHANISM FOR COGNITIVE SYSTEMS

(71) Applicant: INTERNATIONAL BUSINESS MACHINES CORPORATION, Armonk, NY (US)

(72) Inventors: Yasuteru Kohda, Yamato (JP); Nobuyuki Ohba, Sendai (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/717,062

(22) Filed: Sep. 27, 2017

(65) Prior Publication Data
US 2019/0097821 A1 Mar. 28, 2019

(51) Int. Cl.
*H04L 12/18* (2006.01)
*H04L 12/707* (2013.01)
*H04L 12/761* (2013.01)

(52) U.S. Cl.
CPC .......... *H04L 12/184* (2013.01); *H04L 12/189* (2013.01); *H04L 12/1854* (2013.01); *H04L 12/1886* (2013.01); *H04L 45/16* (2013.01); *H04L 45/24* (2013.01)

(58) Field of Classification Search
CPC ... H04L 12/18; H04L 12/185; H04L 12/1845; H04L 65/4076; H04L 45/16; H04L 12/184; H04L 12/1886; H04L 45/24; H04L 45/00; H04L 45/48; H04L 45/20; H04L 45/02; H04L 12/1854; H04L 12/189; H04L 12/44; H04L 69/22; H04L 29/0653; H04L 49/201; H04L 49/3009; H04L 67/12; H04L 41/12; H04W 84/18; H04W 40/20; H04W 4/021; H04W 4/023
See application file for complete search history.

(56) References Cited

U.S. PATENT DOCUMENTS

| | | | | |
|---|---|---|---|---|
| 4,760,572 A | * | 7/1988 | Tomikawa | H04L 12/1886 340/9.1 |
| 6,243,758 B1 | * | 6/2001 | Okanoue | H04L 12/185 370/389 |
| 9,526,030 B2 | | 12/2016 | Goergen et al. | |
| 9,565,620 B2 | | 2/2017 | Dukes et al. | |

(Continued)

FOREIGN PATENT DOCUMENTS

WO 2014151051 A2 9/2014

OTHER PUBLICATIONS

Baumann, "Routing Packets into Wireless Mesh Networks", Third IEEE International Conference of Wireless and Mobile Computing, Networking and Communications, Dec. 2007, pp. 1-8.

(Continued)

*Primary Examiner* — Ricardo H Castaneyra
(74) *Attorney, Agent, or Firm* — Tutunjian & Bitetto, P.C.; Vazken Alexanian

(57) ABSTRACT

A method, system, and data structure for sending data in a network which includes a plurality of nodes is provided. The method includes sending the data from a source node to an intermediate node. The method also includes sending the data from the intermediate node to plural destination nodes within a portion of the network. The portion is defined based on at least one physical distance from the intermediate node.

20 Claims, 10 Drawing Sheets

(56) References Cited

U.S. PATENT DOCUMENTS

| | | | |
|---|---|---|---|
| 2005/0226195 A1* | 10/2005 | Paris | H04L 1/16 |
| | | | 370/338 |
| 2006/0221844 A1* | 10/2006 | Subramanian | H04L 12/18 |
| | | | 370/248 |
| 2010/0069109 A1* | 3/2010 | Hall | H04W 72/1215 |
| | | | 455/522 |
| 2010/0111088 A1* | 5/2010 | Olofsson | G06F 15/17381 |
| | | | 370/392 |
| 2010/0232370 A1 | 9/2010 | Jing et al. | |
| 2011/0072239 A1* | 3/2011 | Burger | G06F 9/30145 |
| | | | 712/29 |
| 2013/0223447 A1* | 8/2013 | Kahng | H04L 61/609 |
| | | | 370/392 |

OTHER PUBLICATIONS

El-Obaid, "Broadcast Wormhole-Routed 3-D Mesh Networks", International Journal Journal of Computer Networks & Communications (IJNC) vol. 7, No. 4, Jul. 2015, pp. 153-167.
"Multicast over a GRE Tunnel-Cisco", https://www.cisco.com/c/en/us/support/docs/ip/ip-multicast/43584-mcast-over-gre.html, Jun. 23, 2016, pp. 1-5.

* cited by examiner

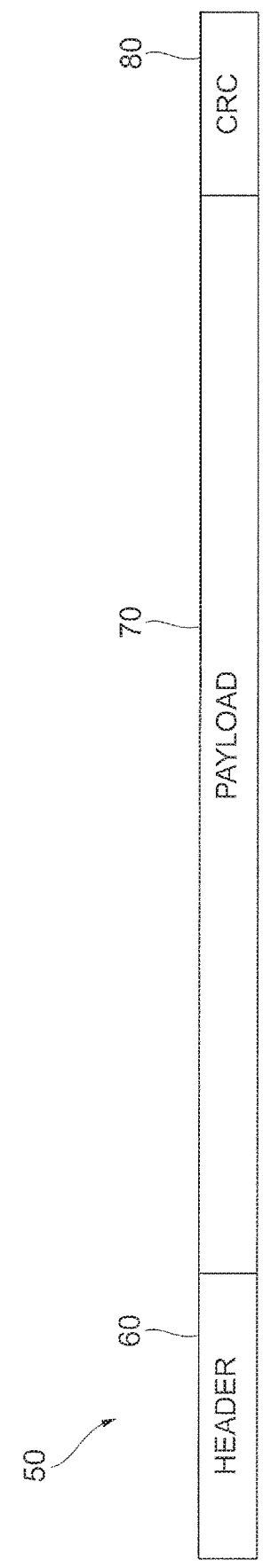
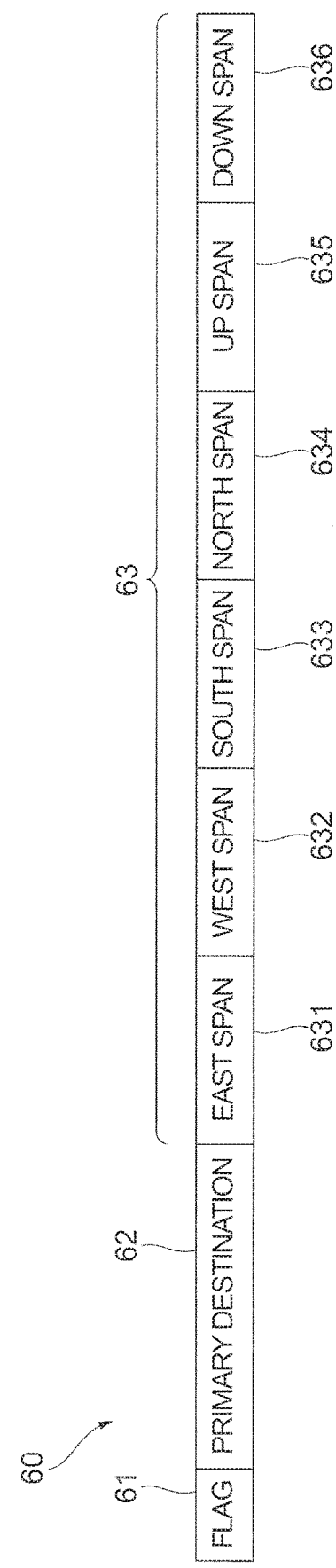

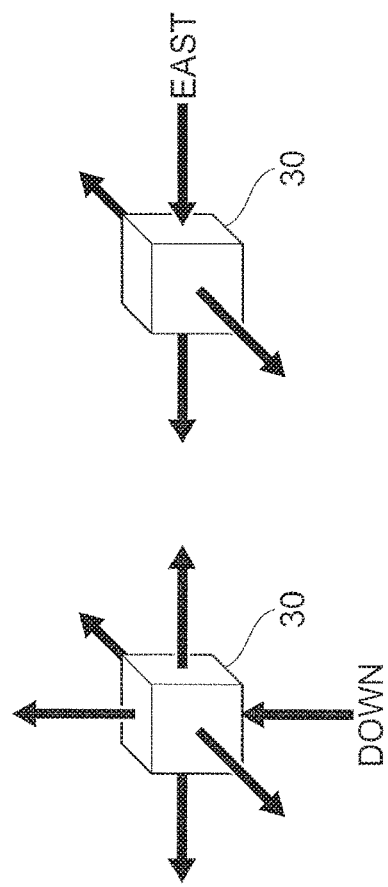
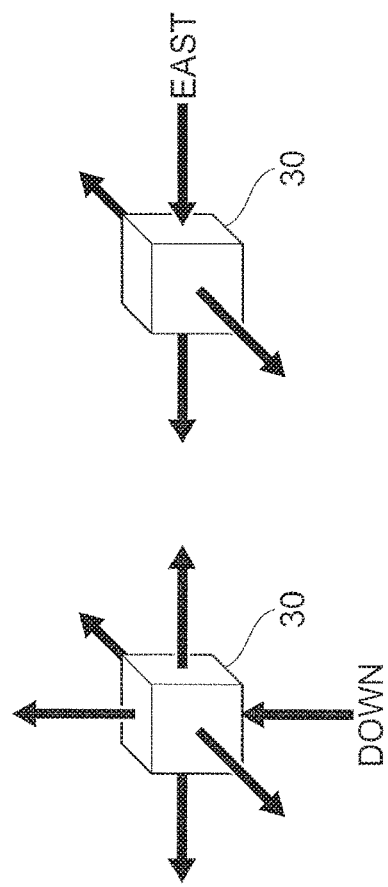
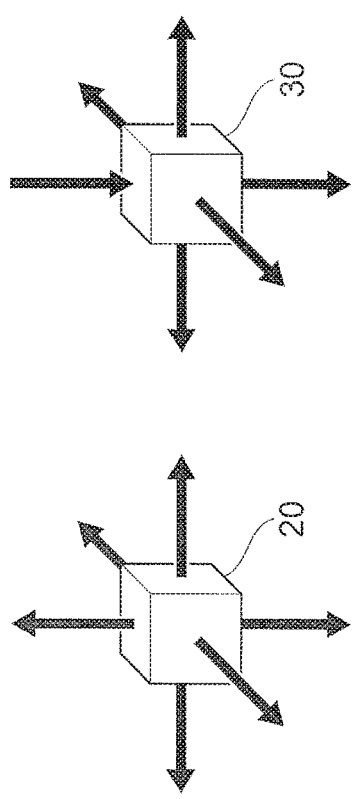
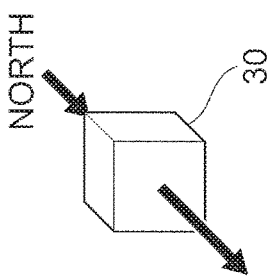
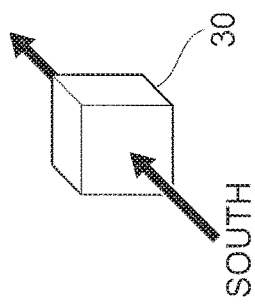
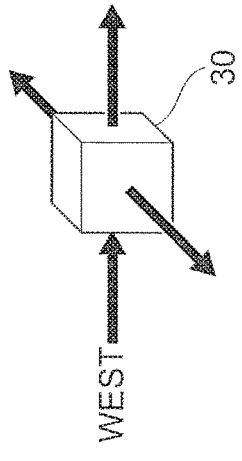
FIG.4A FIG.4B FIG.4C FIG.4D FIG.4E FIG.4F FIG.4G

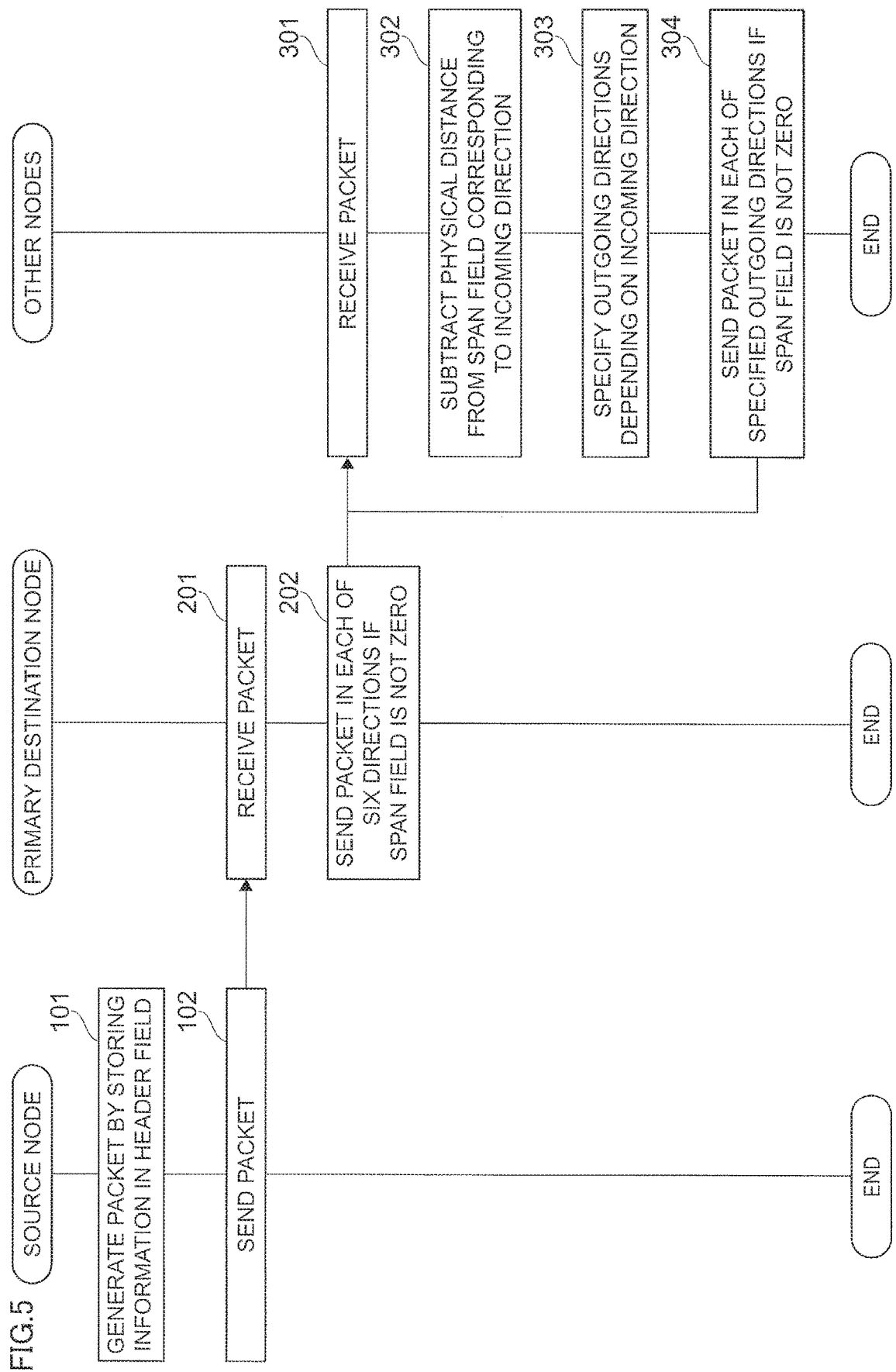

MULTI-STEP REMOTE PACKET BROADCASTING/MULTICASTING MECHANISM FOR COGNITIVE SYSTEMS

BACKGROUND

Technical Field

The present invention relates to sending of data in a network.

Description of the Related Art

Recently, various techniques have been known regarding sending of data in a network.

SUMMARY

According to an embodiment of the present invention, there is provided a method for sending data in a network which includes a plurality of nodes. The method includes sending the data from a source node to an intermediate node. The method further includes sending the data from the intermediate node to a plurality of destination nodes within a portion of the network. The portion is defined based on at least one physical distance from the intermediate node.

According to another embodiment of the present invention, there is provided a network system including a plurality of nodes. The network system includes a source node, an intermediate node, and a plurality of destination nodes. In the network system, the source node sends data to the intermediate node. The intermediate node sends the data to the plurality of destination nodes. The plurality of destination nodes being within a portion of the network system. The portion is defined based on at least one physical distance from the intermediate node.

According to yet another embodiment of the present invention, there is provided a structure of data sent in a network which includes a plurality of nodes. The structure includes a first field storing information indicating an intermediate node to which a source node sends the data. The structure further includes a second field storing information indicating at least one physical distance from the intermediate node. The at least one physical distance defines a portion of the network. The portion includes a plurality of destination nodes to which the intermediate node sends the data.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIGS. 3A and 3B depict schematic diagrams illustrating an example of a packet format for the 3D mesh-connected network in the preferred exemplary embodiment.

FIGS. 4A, 4B, 4C, 4D, 4E, 4F, and 4G depict schematic diagrams illustrating an example of a routing strategy for avoiding duplicated packets in the destination portion.

FIG. 5 depicts a sequence chart representing an example of an operation of a 3D mesh-connected network according to the preferred exemplary embodiment.

DETAILED DESCRIPTION

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration and not limiting, and may not show actual dimensions.

Recently, there have been developed machine intelligence systems which use a three-dimensional (3D) mesh-connected network designed after a human brain. In the human brain, a neural signal generated at a site may be transmitted to a remote site. The machine intelligence systems simulate this neural signal flow by sending a packet from a source node to a destination portion remote from the source node in the 3D mesh-connected network. Specifically, the machine intelligence systems may send a packet using two-step packet broadcasting. The two-step packet broadcasting indicates that the source node sends a packet to a primary node in the destination portion (hereinafter referred to as a "primary destination node"), and the primary destination node sends the packet to all nodes in the destination portion.

However, in the human brain, a neural signal may be transmitted from the remote site to outside of the remote site by a shortcut link. The shortcut link may be generated to transmit the neural signal quickly between two sites, if the neural signal is often sent between the two sites.

In view of this, the exemplary embodiments provide two-step packet broadcasting using a physical distance. The two-step packet broadcasting using the physical distance indicates that the source node sends a packet to the primary destination node, and the primary destination node sends the packet to all nodes in the destination portion determined, not based on the number of hops, but based on the physical distance. The number of hops indicates the number of nodes through which the packet passes after starting at one node and before arriving at another node. Meanwhile, the physical distance indicates a distance calculated using positions of two nodes. Each of the positions may not necessarily be a position where a node actually exists, and may be a position indicated by position information which the node stores.

Note that, although the packet is used in the exemplary embodiments, another type of data may be used. Further, although a mesh-connected network is used in the exemplary embodiments, another type of network may be used. Another such network may include a torus network.

First, a preferred exemplary embodiment will be described.

Figure 1A:
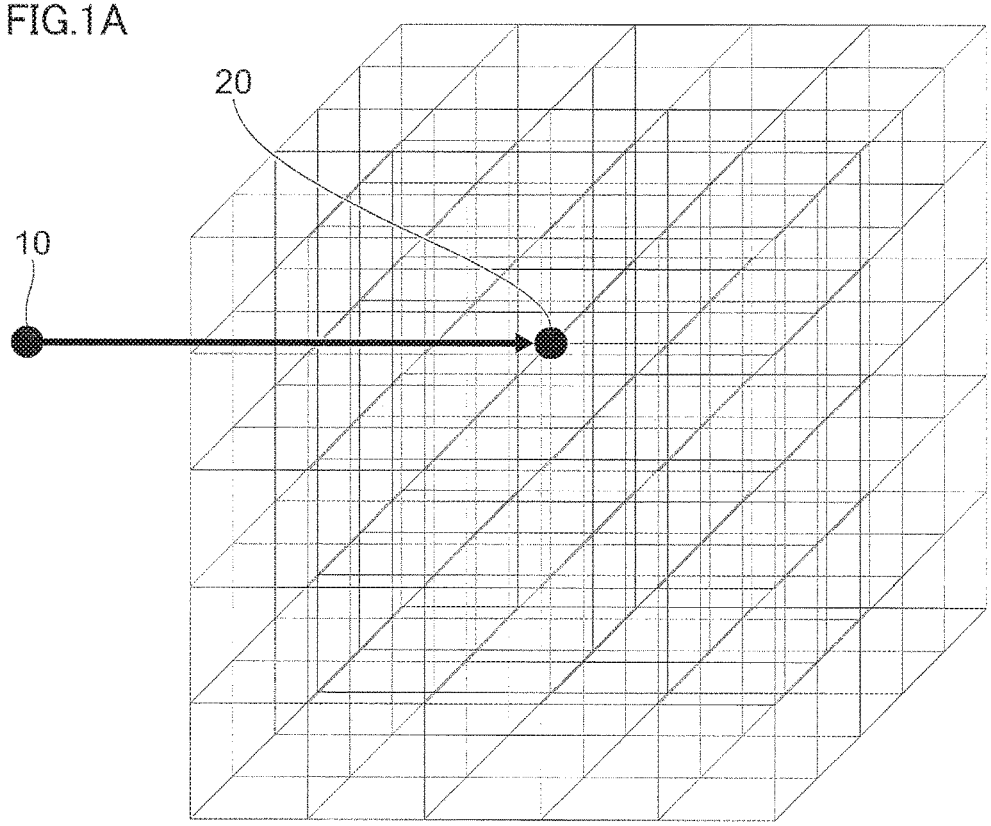
FIGS. 1A and 1B depict schematic diagrams illustrating an example of two-step packet broadcasting using a physical distance according to a preferred exemplary embodiment of the present invention.
Figure 1B:
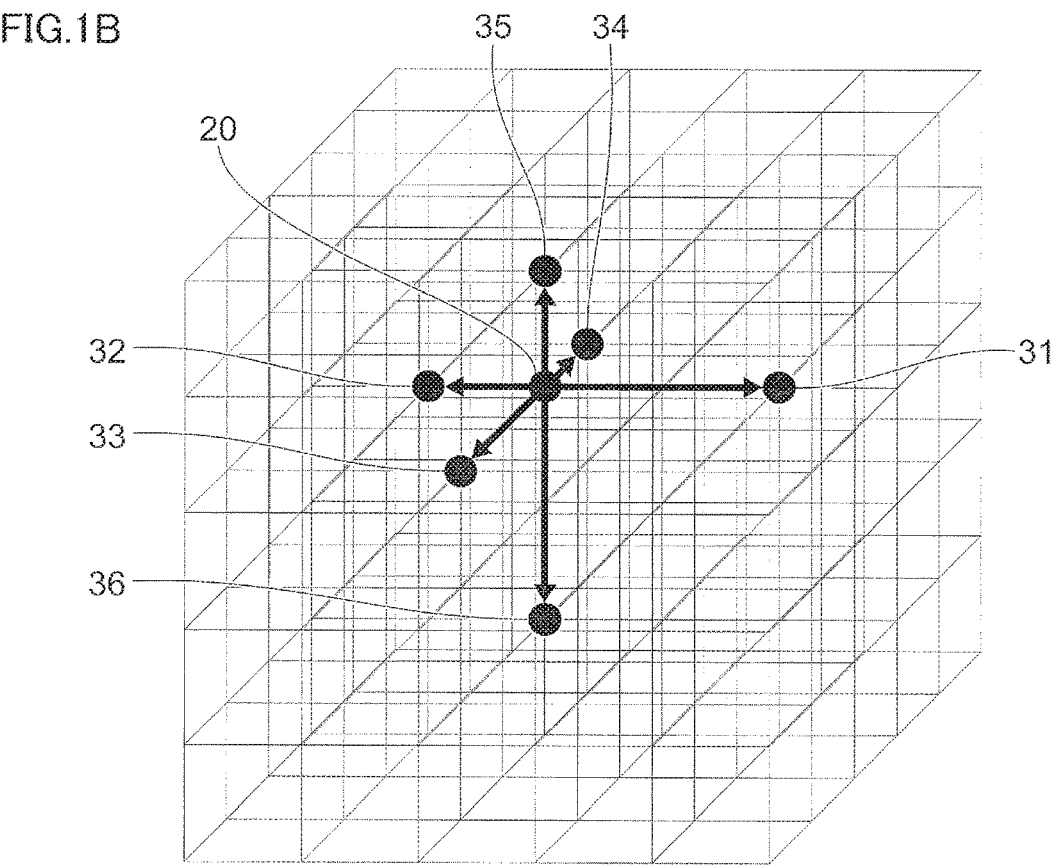

Referring to FIGS. 1A and 1B, there are shown schematic diagrams illustrating an example of the two-step packet broadcasting using the physical distance. In each of the figures, a meshed cube represents a part of the 3D mesh-connected network including the destination portion.

FIG. 1A shows the first step of the two-step packet broadcasting using the physical distance. At the first step, a source node 10 may send a packet to a primary destination node 20 in the destination portion. Note that the primary destination node 20 serves as one example of the claimed intermediate node.

FIG. 1B shows the second step of the two-step packet broadcasting using the physical distance. At the second step, the primary destination node 20 may broadcast packets so that all nodes in the destination portion receive the packets. In this figure, nodes 31 to 36 are nodes farthest from the primary destination node 20 in six directions, among all nodes which receive the packets. Note that the destination portion serves as one example of the claimed portion of the network, and all nodes in the destination portion serve as one example of the claimed plurality of nodes within the portion of the network.

Figure 2:
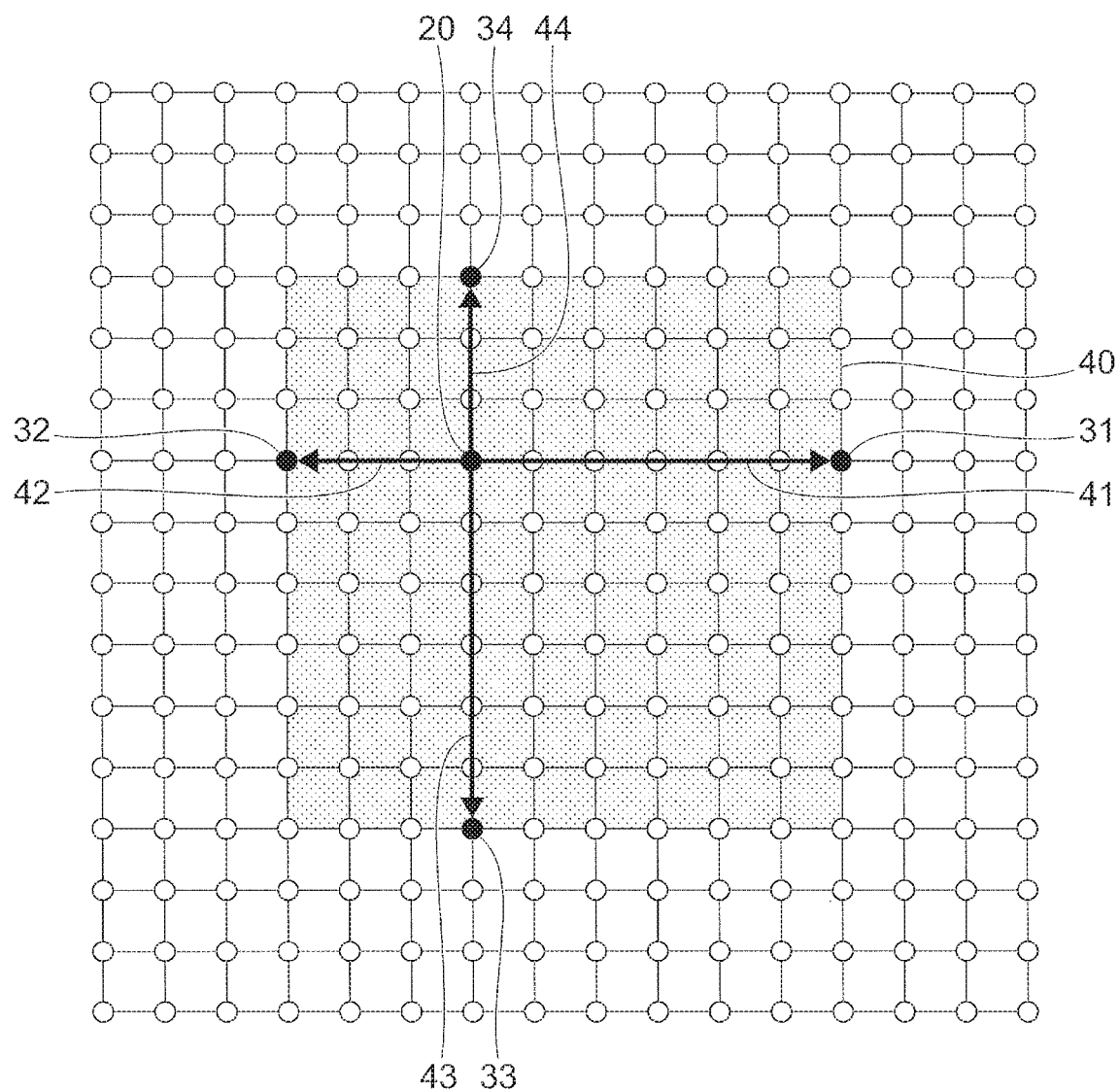
FIG. 2 depicts a schematic diagram illustrating an example of the second step of the two-step packet broadcasting using the physical distance on a two-dimensional plane.

Referring to FIG. 2, there is shown a schematic diagram illustrating an example of the second step of the two-step packet broadcasting using the physical distance on a two-dimensional plane including the nodes 31 to 34 of FIG. 1B.

In the preferred exemplary embodiment, directions from the primary destination node 20 to the nodes 31, 32, 33, and 34 are denoted as an east direction, a west direction, a south direction, and a north direction, respectively. Further, spans (i.e., physical distances) from the primary destination node 20 to the nodes 31, 32, 33, and 34 are denoted as an east span 41, a west span 42, a south span 43, and a north span 44, respectively. The east span 41, the west span 42, the south span 43, and the north span 44 may define a destination portion 40 indicated by hatching. In this figure, the east span 41 is assumed to be two times as long as the west span 42, and the south span 43 is assumed to be two times as long as the north span 44. Thus, the destination portion 40 may be asymmetric with respect to the primary destination node 20.

In this figure, since the mesh-connected network is two-dimensional, the east span 41, the west span 42, the south span 43, and the north span 44 are used. However, in the 3D mesh-connected network, an up span and a down span may be used in addition to the spans stated above. The up span may be a span in an up direction, which is a front direction on the figure, and the down span may be a span in a down direction, which is a rear direction on the figure.

Note that the east span, the west span, the south span, the north span, the up span, and the down span serve as one example of the claimed plurality of physical distances. The east direction and the west direction serve as one example of the claimed two directions opposite to each other along a first axis. The south direction and the north direction serve as one example of the claimed two directions opposite to each other along a second axis. The up direction and the down direction serve as one example of the claimed two directions opposite to each other along a third axis.

Referring to FIGS. 3A and 3B, there are shown schematic diagrams illustrating an example of a packet format for the 3D mesh-connected network in the preferred exemplary embodiment.

As shown in FIG. 3A, a packet format 50 may include a header field 60, a payload field 70, and a cyclic redundancy check (CRC) field 80.

As shown in FIG. 3B, the header field 60 may include a flag field 61, a primary destination field 62, and a span field 63. The flag field 61 may store a flag indicating whether or not the packet format is meant for the two-step packet broadcasting. The primary destination field 62 may store identification information (an IP address, an XYZ coordinate, or the like) of the primary destination node 20. Note that the primary destination field 62 serves as one example of the claimed first field.

The span field 63 may include an east span field 631, a west span field 632, a south span field 633, a north span field 634, an up span field 635, and a down span field 636. The east span field 631, the west span field 632, the south span field 633, the north span field 634, the up span field 635, and the down span field 636 may store the east span, the west span, the south span, the north span, the up span, and the down span, respectively. Note that the span field 63 serves as one example of the claimed second field. Every time when the packet arrives at a current node from an incoming direction, a span field of the current node corresponding to the incoming direction may be decremented by a physical distance between the previous node and the current node.

Referring to FIGS. 4A to 4G, there are shown schematic diagrams illustrating an example of a routing strategy for avoiding duplicated packets in the destination portion.

As shown in FIG. 4A, the primary destination node 20 may forward a packet in each of six directions if the span field corresponding to the direction is not zero.

As shown in FIG. 4B, when receiving a packet from the up direction, the node 30 may forward the packet in each of five other directions if the span field corresponding to the direction is not zero. Further, as shown in FIG. 4C, when receiving a packet from the down direction, the node 30 may forward the packet in each of five other directions if the span field corresponding to the direction is not zero.

As shown in FIG. 4D, when receiving a packet from the east direction, the node 30 may forward a packet in each of the west, south, and north directions if the span field corresponding to the direction is not zero. Further, as shown in FIG. 4E, when receiving a packet from the west direction, the node 30 may forward a packet in each of the east, south, and north directions if the span field corresponding to the direction is not zero.

As shown in FIG. 4F, when receiving a packet from the south direction, the node 30 may forward a packet in the north direction if the north span field is not zero. Further, as shown in FIG. 4G, when receiving a packet from the north direction, the node 30 may forward a packet in the south direction if the south span field is not zero.

Referring to FIG. 5, there is shown a sequence chart representing an example of the operation of the 3D mesh-connected network according to the preferred exemplary embodiment.

First, the source node 10 may generate a packet by storing information in the header field 60 (step 101). Specifically, the source node 10 may store a flag in the flag field 61, and store identification information of the primary destination node 20 in the primary destination field 62. Further, the source node 10 may store the east, west, south, north, up, and down spans in the east, west, south, north, up, and down span fields 631 to 636, respectively. Subsequently, the source node 10 may send the generated packet to the primary destination node 20 (step 102).

In response to sending of the packet by the source node 10, the primary destination node 20 may receive the packet from the source node 10 (step 201). Subsequently, the primary destination node 20 may send the packet in each of six directions if the span field corresponding to the direction is not zero (step 202).

Meanwhile, the node 30 may receive the packet from the previous node (step 301). The previous node may be either one of the primary destination node 20 and a node which has received the packet from the primary destination node 20. When receiving the packet, the node 30 may subtract a physical distance from the previous node along an incoming direction, from a span stored in a span field corresponding to the incoming direction (step 302). For example, when receiving the packet from the up direction, the node 30 may subtract the physical distance from the previous node along the up direction, from an up span stored in the up span field 635. When receiving the packet from the east direction, the node 30 may subtract the physical distance from the previous node along the east direction, from an east span stored in the east span field 631. Further, when receiving the packet from the south direction, the node 30 may subtract the physical distance from the previous node along the south direction, from a south span stored in the south span field 633.

Then, the node 30 may specify one or more outgoing directions depending on the incoming direction (step 303). For example, when receiving the packet from the up direction, the node 30 may specify five outgoing directions shown in FIG. 4B. When receiving the packet from the east direction, the node 30 may specify three outgoing directions shown in FIG. 4D. Further, when receiving the packet from the south direction, the node 30 may specify one outgoing direction shown in FIG. 4F. Subsequently, the node 30 may send the packet in each of the specified directions if the span field corresponding to the direction is not zero (step 304).

Referring to FIGS. 6A to 6D, there are shown schematic diagrams illustrating a difference between hop control in a conventional technique and physical distance control in the preferred exemplary embodiment.

Figure 6A:
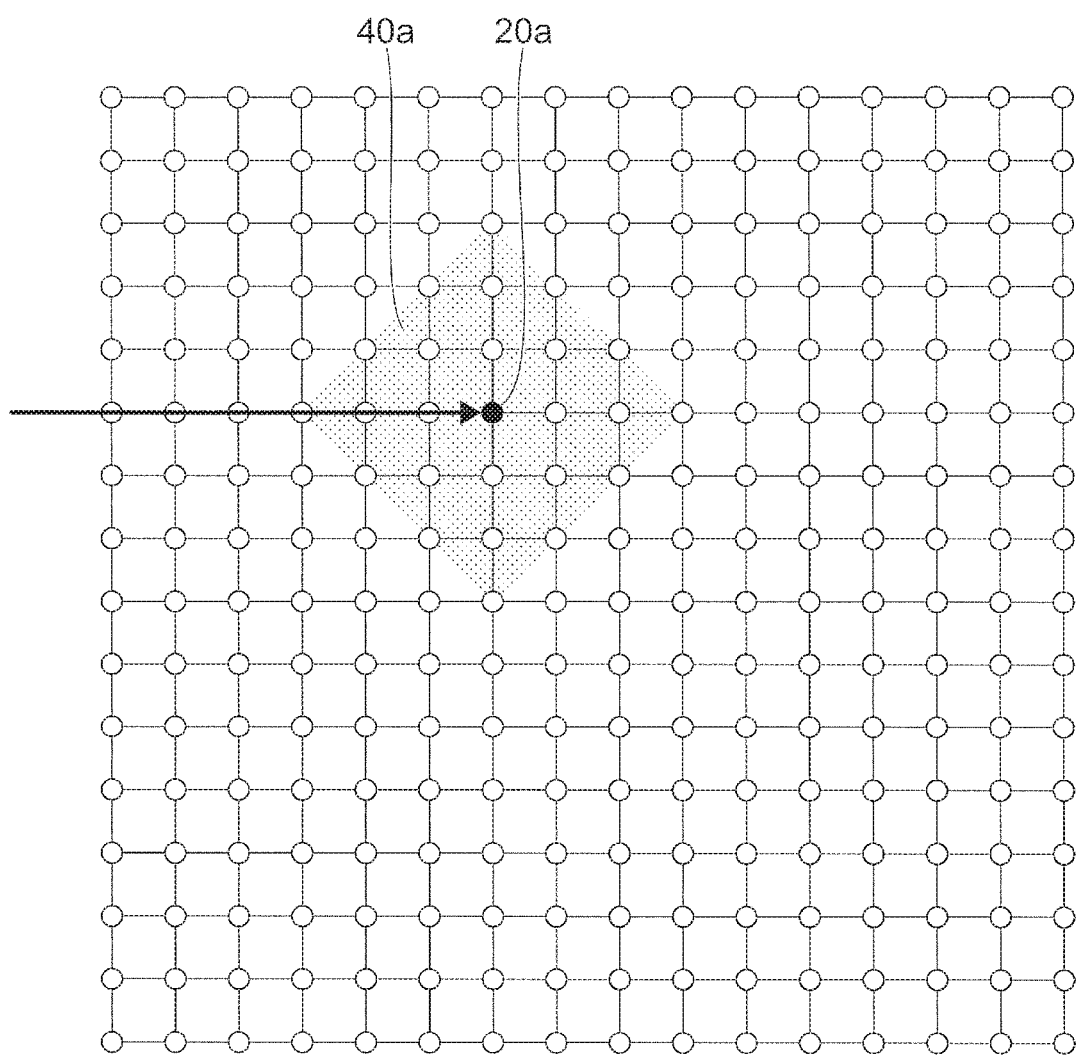
FIGS. 6A, 6B, 6C, and 6D depict schematic diagrams illustrating a difference between hop control in a conventional technique and physical distance control in the preferred exemplary embodiment.
Figure 6B:
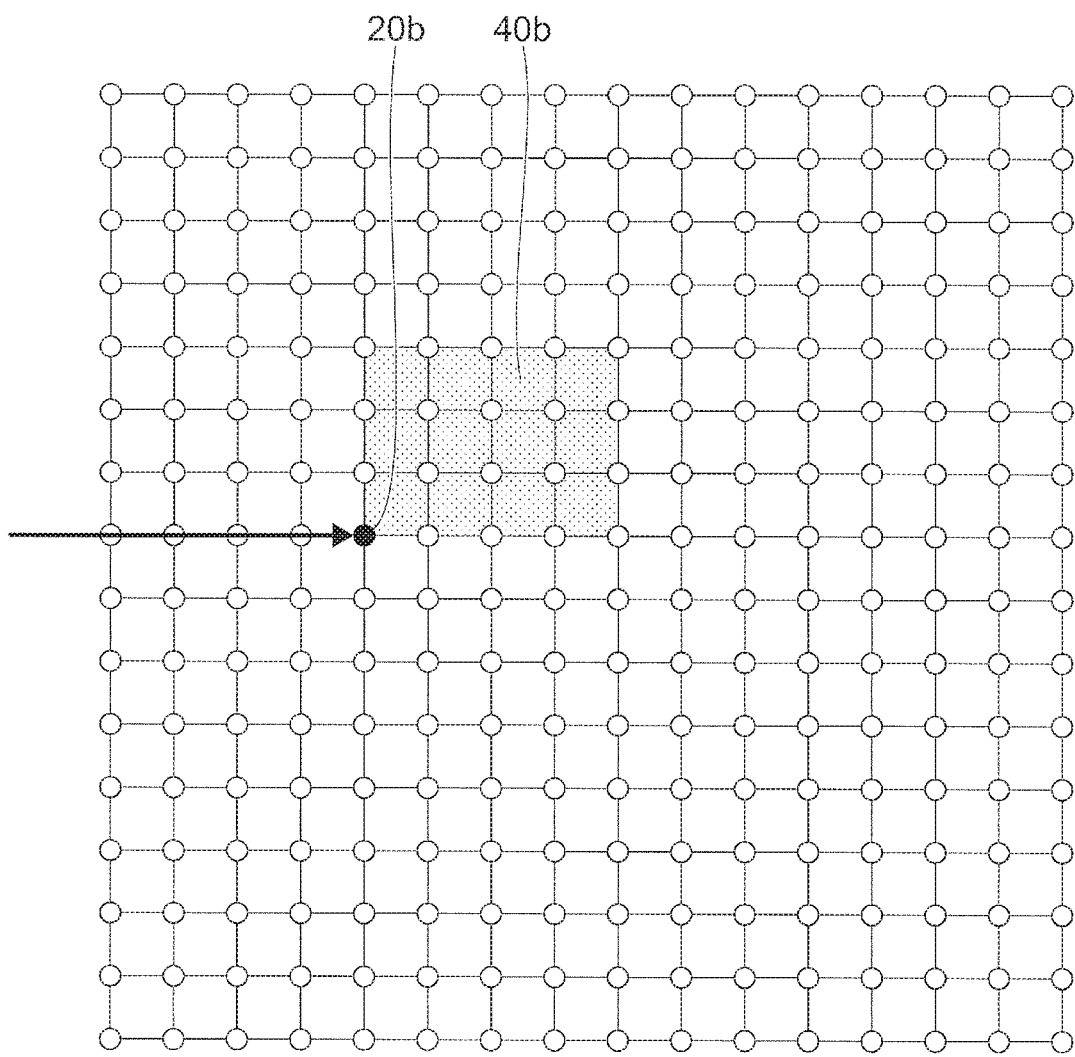

FIGS. 6A and 6B show the difference in the case of a fully symmetric mesh-connected network. The fully symmetric mesh-connected network indicates a mesh-connected network which is not a cluster of plural mesh-connected sub networks and does not include any shortcut links.

When the hop control is used, as shown in FIG. 6A, a destination portion 40*a* may be symmetric with respect to a primary destination node 20*a*.

On the other hand, when the physical distance control is used, as shown in FIG. 6B, a destination portion 40*b* can be asymmetric with respect to the center point of the destination portion 40*b*, and a primary destination node 20*b* can be located at a position other than the center point. In other words, the destination portion 40*b* can be asymmetric with respect to the primary destination node 20*b*.

Figure 6C:
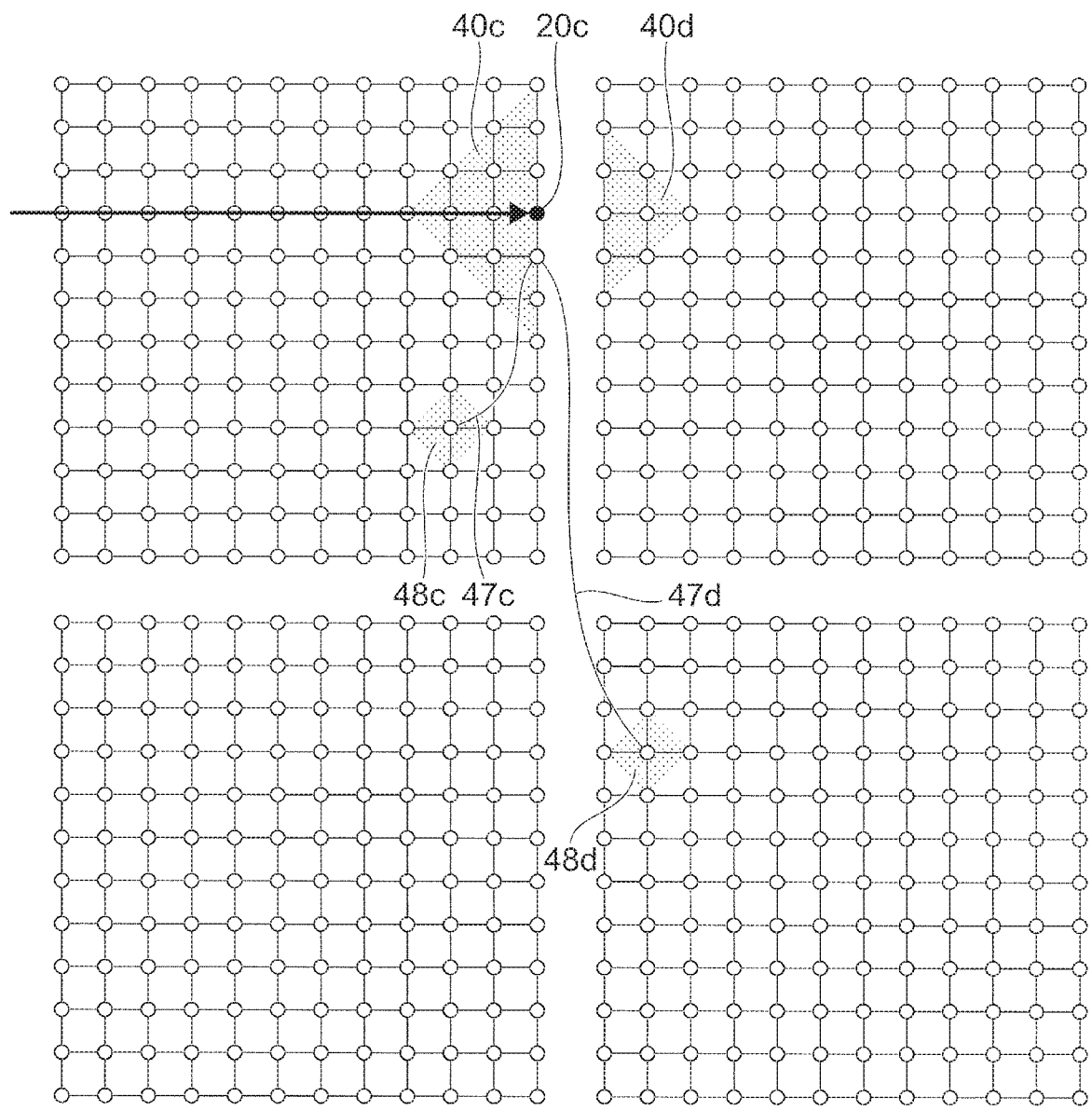
Figure 6D:
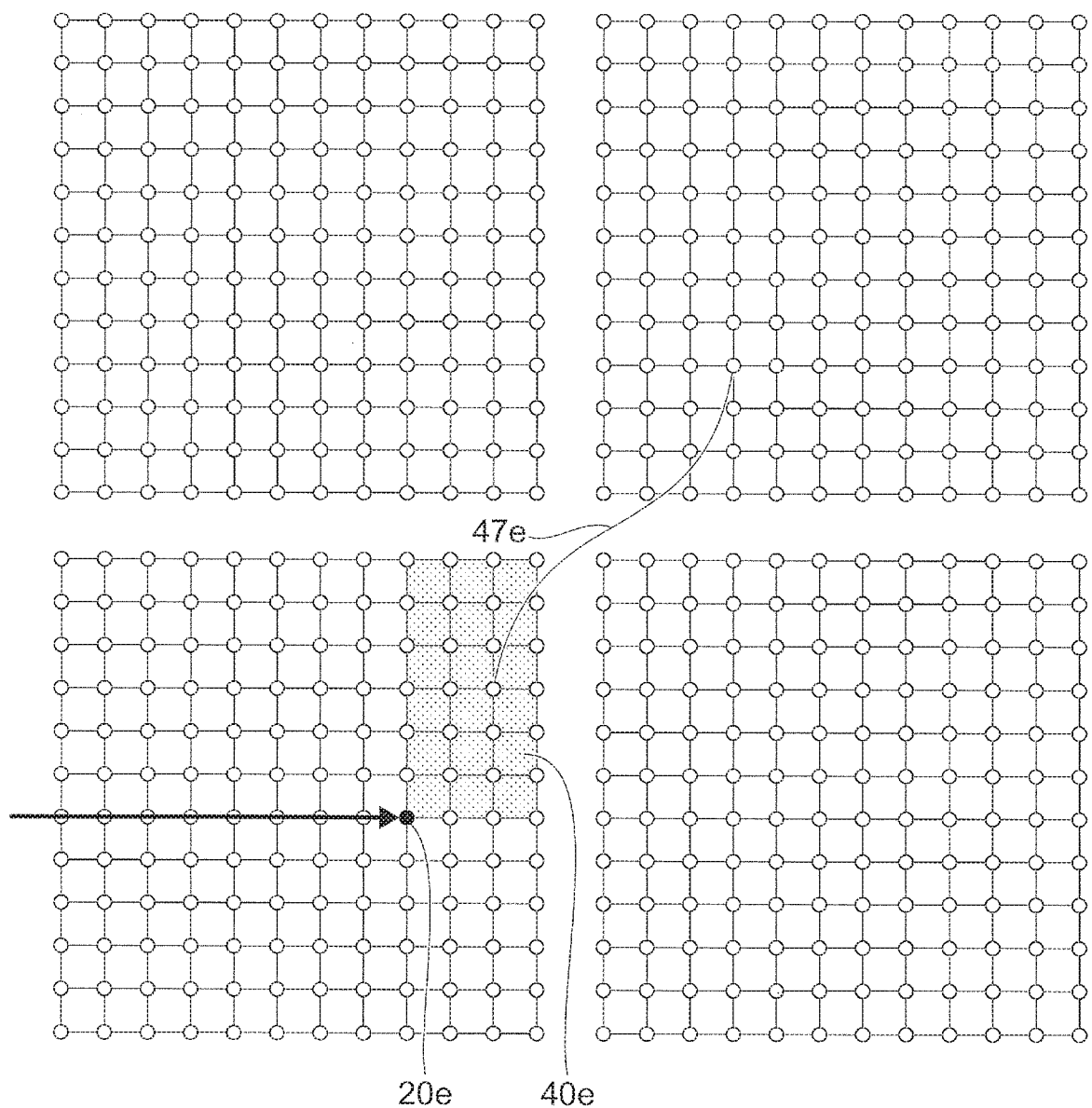

FIGS. 6C and 6D show the difference in the case of an asymmetric mesh-connected network like a human brain. The asymmetric mesh-connected network indicates a mesh-connected network which is a cluster of plural mesh-connected sub networks separated from each other and includes one or more shortcut links.

When the hop control is used, as shown in FIG. 6C, a destination portion may protrude to other mesh-connected sub networks. In the figure, a part of the destination portion which does not protrude to other mesh-connected sub networks is denoted as a portion 40*c*, and a part of the destination portion which protrudes to another mesh-connected sub network is denoted as a portion 40*d*. Further, shortcut links may make other parts of the destination portion on the outside of the portion 40*c*. In the figure, a part of the destination portion made by a shortcut link 47*c* is denoted as a portion 48*c*, and a part of the destination portion made by a shortcut link 47*d* is denoted as a portion 48*d*.

On the other hand, when the physical distance control is used, as shown in FIG. 6D, a destination portion cannot protrude to other mesh-connected sub networks. In the figure, an entire part of the destination portion which does not protrude to other mesh-connected sub networks is denoted as a portion 40*e*. Further, shortcut links can make no other parts of the destination portion on the outside of the portion 40*e*. In the figure, although a shortcut link 47*e* comes out of the portion 40*e*, the shortcut link 47*e* can make no other parts on the outside of the portion 40*e*. In other words, the portion 40*e* excludes a specific node which is outside of the portion 40*e* and is linked by the shortcut link 47*e* to a node within the portion 40*e*, even if a number of links from a primary destination node 20*e* to the specific node and a number of links from the primary destination node 20*e* to a node within the portion 40*e* are equivalent.

In the foregoing, the source node 10 is assumed to send the packet to the primary destination node 20 by designating the primary destination node 20 in the packet. However, the source node 10 may send the packet to the primary destination node 20 via at least one pre-stage destination node by designating the at least one pre-stage destination node and the primary destination node 20 in the packet. Alternatively, the source node 10 may send the packet to plural primary destination nodes by designating the plural primary destination nodes in the packet. In this case, each of the plural primary destination nodes may send the packet to all nodes in the destination portion corresponding to the primary destination node.

Next, an alternative exemplary embodiment will be described.

In the alternative exemplary embodiment, the span field 63 of the header field 60 is assumed to include only one span field, instead of the east, west, south, north, up, and down span fields 631 to 636 of FIG. 3B.

The one span field may store a span in the east, west, south, north, up, and down directions. This is a special case in which the east, west, south, north, up, and down spans are equal to one another. In this case, when the packet arrives at a current node, the current node may determine whether or not it is within the destination portion by comparing each of three physical distances with the span stored in the one span field. The three physical distances may be a physical distance between coordinates of the primary destination node and the current node along an east-west direction, a physical distance between coordinates of these two nodes along a north-south direction, and a physical distance between coordinates of these two nodes along an up-down direction.

Alternatively, the one span field may store a span used as a radius defining the destination portion which is a sphere. In this case, when the packet arrives at a current node, the current node may determine whether or not it is within the destination portion by comparing one physical distance with the span stored in the one span field. The one physical distance may be a physical distance in a straight line between the primary destination node and the current node.

Next, a hardware configuration of each of the nodes in the 3D mesh-connected network is described. Note that each of the nodes may be implemented with a computer 90, so the description will be for the hardware configuration of the computer 90.

Figure 7:
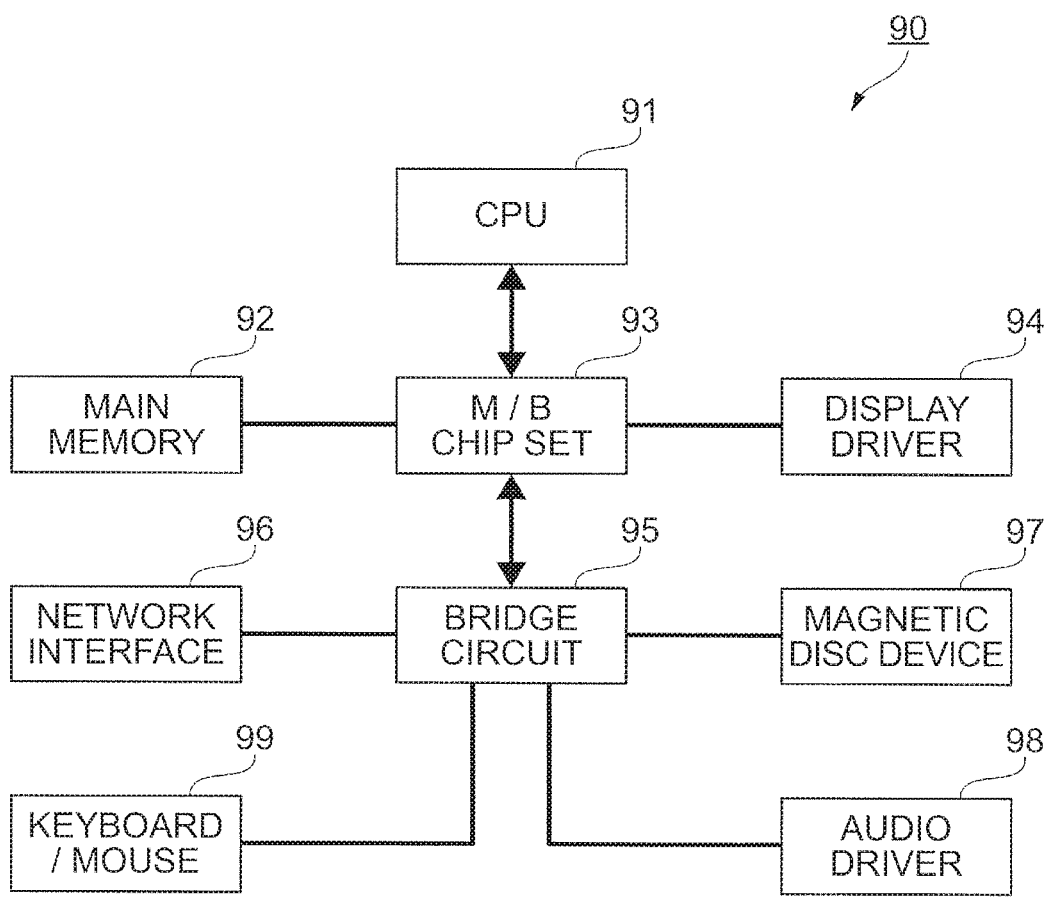
FIG. 7 depicts an example of a hardware configuration of a computer according to exemplary embodiments of the present invention.

Referring to FIG. 7, there is shown an example of a hardware configuration of the computer 90. As shown in the figure, the computer 90 may include a central processing unit (CPU) 91 serving as one example of a processor, a main memory 92 connected to the CPU 91 via a motherboard (M/B) chip set 93 and serving as one example of a memory, and a display driver 94 connected to the CPU 91 via the same M/B chip set 93. A network interface 96, a magnetic disk device 97, an audio driver 98, and a keyboard/mouse 99 are also connected to the M/B chip set 93 via a bridge circuit 95.

In FIG. 7, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 may be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express may be used for the connection, for example. For connecting the magnetic disk device 97 to the bridge circuit 95, a serial AT attachment (ATA), a parallel-transmission ATA, or peripheral components interconnect (PCI) may be used. For connecting the keyboard/mouse 99 to the bridge circuit 95, a universal serial bus (USB) may be used.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A three-dimensional mesh network system including a plurality of nodes of a machine intelligence system, the network system comprising:
    a source node;
    an intermediate node; and
    a plurality of destination nodes having assigned, to each destination node of the plurality of destination nodes, position information identifying a position of the node within the mesh network system, the position within the mesh network system being determined independently of an actual position of each destination node, wherein:
        the source node addresses data to the intermediate node and sends the data to the intermediate node over the mesh network system,
        the intermediate node sends the data to the plurality of destination nodes, and
        the plurality of destination nodes are a portion of the mesh network system, the portion being a volume defined by at least one physical distance from the intermediate node, the at least one physical distance provided in the data sent over the mesh network system.

2. The network system of claim 1, wherein the portion is defined based on a plurality of physical distances in a plurality of directions from the intermediate node.

3. The network system of claim 2, wherein
    the source node sets information in the data, prior to sending the data to the intermediate node, the information indicating the plurality of physical distances in the plurality of directions from the intermediate node, and
    the plurality of destination nodes confirms that they are within the portion, using the information, in response to receiving the data from the intermediate node.

4. The network system of claim 2, wherein the plurality of directions includes two directions opposite to each other along a first axis, two directions opposite to each other along a second axis, and two directions opposite to each other along a third axis, wherein the first axis, the second axis, and the third axis perpendicularly cross each other.

5. The network system of claim 1, wherein the portion has an asymmetric shape with respect to the intermediate node.

6. The network system of claim 1, wherein the portion excludes a specific node which is outside of the portion and is linked by a shortcut link to a node within the portion, even if a number of links from the intermediate node to the specific node and a number of links from the intermediate node to the node within the portion are equivalent.

7. The network system of claim 1, wherein the portion is defined based on one physical distance from the intermediate node.

8. The network system of claim 7, wherein
    the source node sets information in the data, prior to sending the data to the intermediate node, the information indicating the one physical distance from the intermediate node, and
    the plurality of destination nodes confirms that they are within the portion, using the information, in response to receiving the data from the intermediate node.

9. The network system of claim 1, wherein the portion is defined based on six physical distances from the intermediate node.

10. The network system of claim 9, wherein the six physical distances from the intermediate node includes two physical distances opposite to each other along a first axis, two physical distances opposite to each other along a second axis, and two physical distances opposite to each other along a third axis, wherein the first axis, the second axis, and the third axis perpendicularly cross each other.

11. A memory embodying a structure of data to be sent in a three-dimensional mesh network which includes a plurality of nodes of a machine intelligence system, the structure comprising:
    a first field storing information indicating an intermediate node to which a source node sends the data; and
    a second field storing information indicating at least one physical distance from the intermediate node, the at least one physical distance defining a portion of the network, the portion defining a volume including a plurality of destination nodes to which the intermediate node sends the data, wherein inclusion of the plurality of destination nodes in the volume being determined independent of actual positions of the plurality of nodes relative to the intermediate node.

12. The memory of claim 11, wherein the second field stores information indicating a plurality of physical distances in a plurality of directions from the intermediate node.

13. The memory of claim 11, wherein the second field stores information indicating one physical distance from the intermediate node.

14. The memory of claim 11, wherein the second field stores information indicating six physical distances from the intermediate node.

15. The memory of claim 14, wherein the six physical distances from the intermediate node includes two physical distances opposite to each other along a first axis, two physical distances opposite to each other along a second axis, and two physical distances opposite to each other along a third axis, wherein the first axis, the second axis, and the third axis perpendicularly cross each other.

16. A three-dimensional mesh network system including a plurality of nodes of a machine intelligence system, the network system comprising:

a source node;

an intermediate node; and a plurality of destination nodes having assigned, to each destination node of the plurality of destination nodes, position information identifying a position of the node within the mesh network system, the position within the mesh network system being determined regardless of an actual position of each destination node, wherein:

the source node addresses data to the intermediate node and sends the data to the intermediate node over the mesh network system, the intermediate node sends the data to the plurality of destination nodes, and the plurality of destination nodes are a portion of the mesh network system, the portion being a volume defined by at least one physical distance from the intermediate node, the at least one physical distance provided in the data sent over the mesh network system.

17. The network system of claim 16, wherein the portion is defined based on a plurality of physical distances in a plurality of directions from the intermediate node.

18. The network system of claim 17, wherein the source node sets information in the data, prior to sending the data to the intermediate node, the information indicating the plurality of physical distances in the plurality of directions from the intermediate node, and the plurality of destination nodes confirms that they are within the portion, using the information, in response to receiving the data from the intermediate node.

19. The network system of claim 17, wherein the plurality of directions includes two directions opposite to each other along a first axis, two directions opposite to each other along a second axis, and two directions opposite to each other along a third axis, wherein the first axis, the second axis, and the third axis perpendicularly cross each other.

20. The network system of claim 16, wherein the portion has an asymmetric shape with respect to the intermediate node.

* * * * *